US011892721B1

(12) United States Patent
Xun

(10) Patent No.: US 11,892,721 B1
(45) Date of Patent: Feb. 6, 2024

(54) ELECTRONIC PRIVACY SHUTTER FOR LIQUID CRYSTAL DISPLAY DEVICE

(71) Applicant: Amazon Technologies, Inc., Seattle, WA (US)

(72) Inventor: Xiaodong Xun, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/118,227

(22) Filed: Mar. 7, 2023

(51) Int. Cl.
| | |
|---|---|
| G02F 1/133 | (2006.01) |
| G02F 1/1333 | (2006.01) |
| H04N 23/55 | (2023.01) |
| G02F 1/1368 | (2006.01) |
| G02F 1/1335 | (2006.01) |
| G02F 1/1337 | (2006.01) |
| G02F 1/1343 | (2006.01) |
| G09G 3/36 | (2006.01) |

(52) U.S. Cl.
CPC ...... *G02F 1/133388* (2021.01); *G02F 1/1368* (2013.01); *G02F 1/13306* (2013.01); *G02F 1/133528* (2013.01); *G02F 1/133723* (2013.01); *G02F 1/134309* (2013.01); *H04N 23/55* (2023.01); *G09G 3/36* (2013.01)

(58) Field of Classification Search
CPC .......... G02F 1/133388; G02F 1/13306; G02F 1/133528; G02F 1/133723; G02F 1/134309; G02F 1/1368; G02F 1/1334; H04N 23/55; G09G 3/36
See application file for complete search history.

(56) References Cited

U.S. PATENT DOCUMENTS

| | | | | |
|---|---|---|---|---|
| 2021/0325703 | A1* | 10/2021 | Zhang | G09G 3/3413 |
| 2021/0405407 | A1* | 12/2021 | Sun | G02F 1/133331 |

OTHER PUBLICATIONS

Nasir et al., "Polymer-dispersed liquid-crystal-based switchable glazing fabricated via vacuum glass coupling," RSC Advances, Sep. 1, 2020, vol. 10, pp. 32225-32231. DOI: 10.1039/d0ra05911k.

* cited by examiner

*Primary Examiner* — James A Dudek
(74) *Attorney, Agent, or Firm* — Kilpatrick Townsend & Stockton LLP

(57) ABSTRACT

An apparatus includes a liquid crystal layer comprising a first region and a second region. The first region comprises a first plurality of liquid crystal molecules in a first state and the second region comprises a second plurality of liquid crystal molecules in a second state different from the first state. The apparatus also includes a camera positioned to receive light propagating through the second region, a first driver circuit configured to apply a first set of voltages to a first set of electrodes in the first region, and a second driver circuit configured to apply a second set of voltages to a second set of electrodes in the second region.

20 Claims, 9 Drawing Sheets

Device 110

Device 110

ELECTRONIC PRIVACY SHUTTER FOR LIQUID CRYSTAL DISPLAY DEVICE

BACKGROUND

A large and growing population of users is enjoying entertainment through the consumption of digital media items, such as music, movies, images, electronic books, and so on. Users employ various electronic devices to consume such media items. Among these electronic devices are cellular telephones, portable media players, tablet computers, laptops and the like. These electronic devices may additionally include cameras for capturing image and/or video data.

BRIEF DESCRIPTION OF THE DRAWINGS

Various embodiments in accordance with the present disclosure will be described with reference to the drawings, in which.

DETAILED DESCRIPTION

Figure 1:
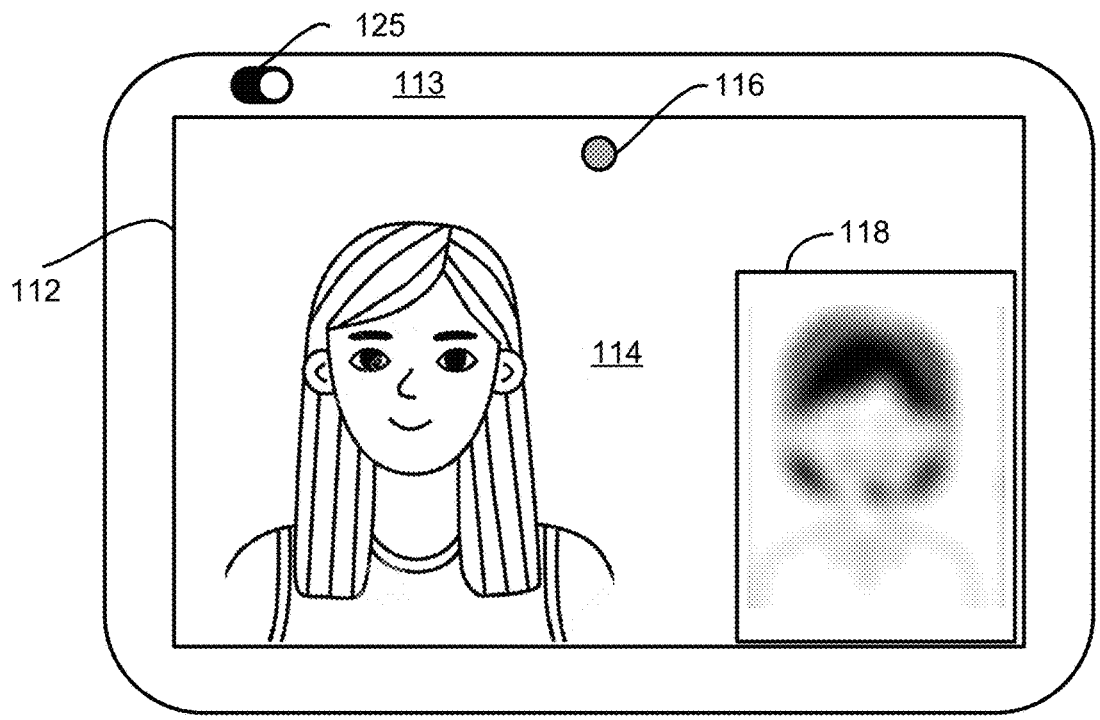
FIG. 1 illustrates a schematic diagram of a device with a liquid crystal display having non-display regions operating in a diffuse state or a transmissive state according to an embodiment of the present disclosure.
Figure 1:
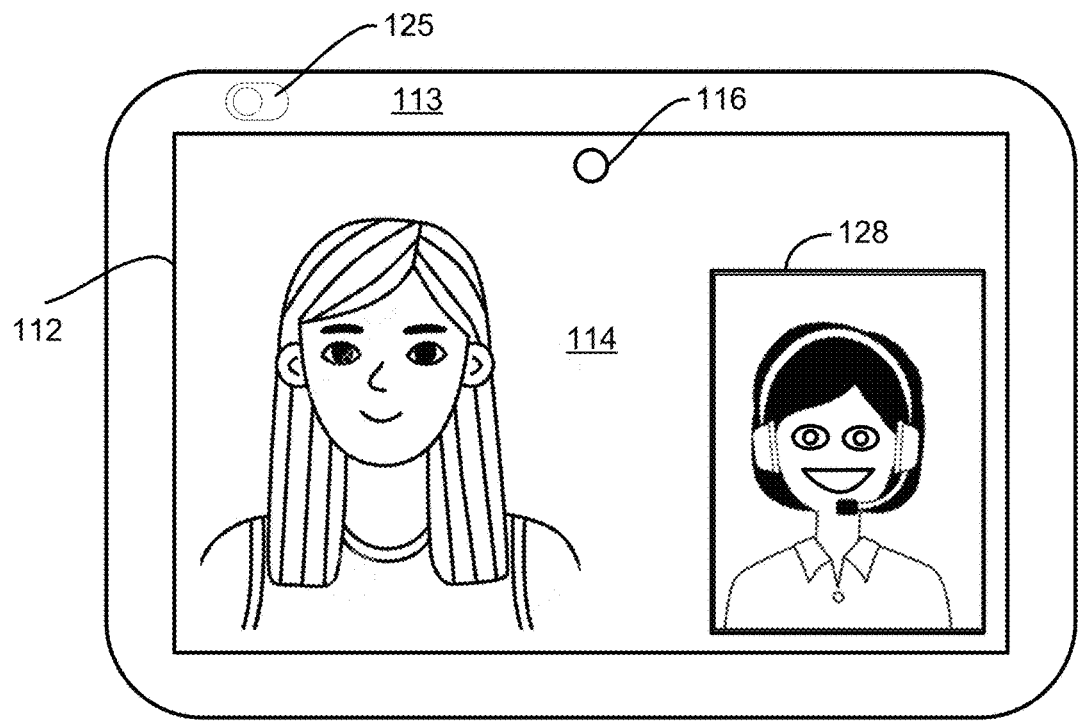

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an electronic privacy shutter that is suitable for use in display devices and other applications. The display device can include a liquid crystal display with a non-display region that is operable to be operated in a diffuse state or a transmissive state. Image data generated by a camera of the display device may be blurry and lack a given amount of detail and/or resolution when the non-display region is operated in the diffuse state and clear (or characterized by an improvement in image contrast with respect to the image obtained in the diffuse state) when the camera is operated in the transmissive state. As illustrated in the embodiments of the present disclosure discussed herein, the transmissive state can include a state in which the image is not 100% clear, but has a given amount of detail and/or resolution greater than that associated with the diffuse state.

In an example, a display device includes a camera and a liquid crystal display. The liquid crystal display includes a display region and a non-display region. The display region and the non-display region may be controlled independently so that voltages applied to the electrodes in the display region do not affect operation of the non-display region. That is, the non-display region may have a non-display region driver circuit and a controller that is separate from a display driver circuit and controller for the display region. The liquid crystal display can include liquid crystal molecules that are in a first state in a display region and that are in a second state in a non-display region. The first state may be associated with the liquid crystal molecules being aligned and the second state may be associated with the liquid crystal molecules being not aligned. The liquid crystal molecules can be part of a liquid crystal layer positioned between a thin-film transistor layer and a color filter array glass. The thin-film transistor layer can include indium tin oxide that operates as an electrical component of the non-display region driver circuit for the non-display region. In a first state, referred to herein as a diffuse state, no voltage (or a voltage less than or equal to a predetermined threshold) is applied to electrodes in the non-display region and the liquid crystal molecules, which are in the second state, scatter light in the non-display region. Thus, an image that is generated by a camera in the non-display region is blurry due to the scattering of light by the liquid crystal molecules. In a second state, referred to herein as a transmissive state, a predetermined voltage (or a voltage greater than or equal to a predetermined threshold) is applied to electrodes in the non-display region and the liquid crystal molecules transition from the second state to the first state in response to the applied voltage. Light can then propagate through the non-display region such that the image that is generated by the camera in the non-display region is not substantially impacted by the presence of the liquid crystal molecules, resulting in a clear image that is suitable for viewing by a user.

The liquid crystal display may have polyimide layers on either side of the liquid crystal layer. Different regions of the polyimide layers may be characterized by different structures that cause the liquid crystal molecules to be in the first state and the second state in the liquid crystal layer. For example, a first region of the polyimide layer may be in the display region and may have a structure that results in the liquid crystal molecules in the display region being in the first state. In contrast, a second region of the polyimide layer may be in the non-display region and may have a structure that results in the liquid crystal molecules in the non-display region being in the second state. Applying a voltage to the electrodes in the non-display region can then cause the liquid crystal molecules in the non-display region to transition to the first state so that the non-display region initially operates in a diffuse state and subsequently in a transmissive state in response to the application of the voltage to the electrodes in the non-display region.

Embodiments of the present disclosure provide several technical advantages compared to a conventional shutter, for example, a mechanical shutter. It may be desirable for a display device to have a narrow opening in front of the camera (i.e., the camera lens) to increase the display fill factor and enhance the appearance of the display device. However, in display systems that utilize a camera with a wide field of view (e.g., greater than 110 degrees), in order to capture images over a wide viewing angle, a mechanical shutter may be placed between the camera and the cover glass of the display. The opening for the camera at the cover glass will generally be larger than desired due to the gap between the camera and the cover glass of the display caused by the mechanical shutter. As an example, if the camera is placed directly under the cover glass so that the camera and the cover glass are in contact, the opening for the camera at the cover glass is the same as the diameter of the camera lens. However, when the mechanical shutter is added between the camera and cover glass of the display, the additional gap resulting from the addition of the mechanical shutter increases the opening for the camera at the cover glass significantly. Embodiments of the present disclosure provide a liquid crystal display with an electronic shutter, also referred to as an electronic privacy shutter, that is controllable in response to the application of a voltage. Thus, the display bezel can be reduced. In addition, the display region may be operated independently from the non-display region, meaning that different controllers can be used to apply display voltages to the display electrodes in the display region and to the electrodes in the non-display region. Having different controllers may reduce system complexity, cost, and power consumption. Since the default state for the non-display region is the diffuse state, the camera may only generate a clear image when voltage is applied to the electrodes in the non-display region. Accordingly, user privacy is provided by embodiments described herein.

FIG. 1 illustrates a schematic diagram of a device with a liquid crystal display having non-display regions operating in a diffuse state or a transmissive state according to an embodiment of the present disclosure. Device 110 includes liquid crystal display 112, which includes a display region 114 and a non-display region 116. The liquid crystal display 112 is surrounded by a bezel 113. The non-display region 116 can be a region in which a camera (not shown) is positioned behind the liquid crystal display 112 (i.e., in a plane behind the plane of the figure). A diameter of the non-display region 116 may be between 3 mm to 6 mm. The diameter of the non-display region 116 is typically measured in the plane of the figure. Although a circular non-display region is illustrated in FIG. 1, the shape of the non-display region can be a non-circular shape, including a square shape, a rectangular shape, or the like. One of ordinary skill in the art would recognize many variations, modifications, and alternatives. In the illustrated embodiment, the non-display region 116 is surrounded by the display region 114.

The liquid crystal display 112 has a length measured in an X-direction, a height measured in a Y-direction, and a thickness or depth measured in a Z-direction. Light emitted from the liquid crystal display 112 generally propagates in the Z-direction as appropriate for viewing by a user holding the device 110 in front of the user. In a first state of operation, liquid crystal molecules in the non-display region 116 can be in a first state (e.g., randomly aligned). The liquid crystal molecules in the first state cause light propagating from locations in front of the liquid crystal display 112 (i.e., at a positive Z-direction value) toward the camera to be at least partially scattered by the liquid crystal molecules. In the illustrated embodiment, the camera is positioned in a plane behind the liquid crystal display 112 (i.e., at a negative Z-direction value). The scattering of light by the liquid crystal molecules results in images generated by the camera being blurry, i.e., the image content not being readily discernable by a user. This first state is thus associated with the non-display region 116 operating in a diffuse state. In a second state of operation, the liquid crystal molecules in the non-display region 116 can transition to a second state (e.g., aligned) as a result of application of a voltage. The liquid crystal molecules in the second state cause light propagating from locations in front of the liquid crystal display 112 (i.e., at a positive Z-direction value) toward the camera to be at least partially transmitted by the liquid crystal molecules. The transmission of light by the liquid crystal molecules results in images generated by the camera being clear. This second state is thus associated with the non-display region 116 operating in a transmissive state. The image quality can be measured using a variety of image quality metrics, including image contrast, the modulation transfer function (MTF), the spatial frequency response (SFR), or the like. As an example, an image could be considered to be blurry if the MTF is less than 75% at a predetermined spatial frequency, less than 50%, less than 25%, less than 20%, or the like, if the SFR is less than a predetermined value, or the contrast is less than a predetermined value. The image quality can also correspond to a clear or transmissive state with higher image quality metrics. For example, an image could be considered to be clear if the MTF is greater than 75% at a predetermined spatial frequency, greater than 50%, greater than 25%, greater than 20%, or the like, if the SFR is greater than a predetermined value, or the contrast is greater than a predetermined value. Alternatively, an image can be considered to be blurry if the content of the image is not readily discernable by a user, i.e., the person in the image is not identifiable by the user, and an image can be considered to be clear if the content of the image is readily discernable by a user, i.e., the person in the image is identifiable by the user. Referring to FIG. 1, image 118 has low image quality metrics while image 128 has higher image quality metrics than image 118. The diffuse state has first image quality metrics and the transmissive state has higher image quality metrics than the first image quality metrics. The non-display region 116 may be operable so that the image 118 is not just clear, where the person in the image 118 is identifiable by the user, or blurry, where the person in the image 118 is not identifiable by the user. The user may configure the operation of the non-display region 116 in the diffuse state so that the image 118 has particular image quality metrics.

The liquid crystal display 112 can include two polyimide layers with liquid crystal molecules between the layers. In the display region 114, the polyimide layers can have a structure that results in liquid crystal molecules being in the second state, or aligned. In contrast, the polyimide layers in the non-display region 116 can have a structure that results in the liquid crystal molecules being in the first state (e.g., randomized), which causes the image 118 to be blurred as light reaching the camera is scattered as it propagates through the liquid crystal molecules, resulting in the non-display region 116 functioning as a diffuser when operated in the first state, represented by the gray color with which the non-display region 116 is illustrated in the upper portion of FIG. 1. Thus, referring to the upper portion of FIG. 1, device 110 illustrates the non-display region 116 being operated in the first, diffuse state. It should be noted that in some embodiments, the scattering of light propagating toward the camera can be at a high enough level of scattering that little to no light reaches the camera. In this case, the image 118 would have little to no detail, with the non-display region 116 effectively operating in the same manner as a mechanical shutter.

In an example, the device 110 may be used for video communication by a user. An image 118 generated by the camera of the device 110 (i.e., an image of the user of the device 110) is presented on the liquid crystal display 112 in a portion of the display region 114 during the video communication. In the first, diffuse state, the image 118 that is generated is blurry because of the state of the liquid crystal molecules when the non-display region 116 is operated in the diffuse state. As illustrated, with the non-display region operating in this diffuse state, only an outline of the user may be visible in the image 118 rather than fine details corresponding to the appearance of the user and their surroundings. In systems that use mechanical shutters, the mechanical shutter obstructs the optical path of the light received by the camera and prevents light from reaching the camera. In this first, diffuse state, which provides an operation state comparable to a mechanical shutter being positioned in a closed state, the user is not identifiable since the image 118 merely indicates the outline of the user.

As discussed above, the non-display region 116 may be operated in a diffuse state. The state of the liquid crystal molecules in the non-display region 116 can be changed, resulting in the non-display region 116 being operated in a transmissive state in which the image 128 is clear. A camera (not shown) is positioned behind the liquid crystal display 112 (i.e., at a negative Z-direction value) in the non-display region 116 as discussed above. The liquid crystal display 112 includes two polyimide layers with liquid crystal molecules between the layers. In the display region 114, the polyimide layers can have a structure that results in liquid crystal molecules being in the second, aligned state and the polyimide layers in the non-display region 116 can have a structure that results in the liquid crystal molecules being in the first, not aligned state. In the second, transmissive state, the state of the liquid crystal molecules can be changed by applying a voltage to electrodes in the non-display region 116 so that the liquid crystal molecules transition from the first state to the second state in the non-display region 116. Transitioning to the second state results in light propagating from locations in front of the liquid crystal display 112 (i.e., at a positive Z-direction value) toward the camera to be at least partially transmitted by the liquid crystal molecules, resulting in images generated by the camera being clear, represented by the non-display region 116 being clear as is illustrated in the lower portion of FIG. 1. The user may cause the voltage to be applied to the electrodes in the non-display region 116, resulting in the liquid crystal molecules being aligned, by manipulating a toggle switch 125.

In the example of the device 110 providing video communication to a user using the device 110, the image 128 generated by the camera is presented on the liquid crystal display 112 in a portion of the display region 114. Operating in the second, transmissive state, the voltage has been applied to the electrodes in the non-display region 116, thereby causing the liquid crystal molecules in the non-display region 116 to be in the second state, which corresponds to the second, transmissive state in which the image 128 that is generated is clear. As illustrated, the image of the user is clear and finer details corresponding to the appearance of the user and their surroundings are distinguishable. Thus, in this second, transmissive state, which generally corresponds to a mechanical shutter being positioned in an open state, the user is identifiable since the image 128 includes a detailed image corresponding to the user.

The default state for the operation of the non-display region 116 of the device 110 may be the first state in which the liquid crystal molecules are in the first state (i.e., the diffuse state) in the non-display region 116. Thus, the default state may be considered a privacy state since the image generated by the camera is not clear and the user is not identifiable, with the image 118 merely indicating the outline of the user. The camera may only generate a clear image when the voltage is applied to the electrodes in the non-display region 116, which causes the liquid crystal molecules to transition to the second state. As a result, the default state may provide privacy and security to the user of the device 110 and a desired user experience when the user wishes to have their image transmitted to the other user as illustrated by device 110 in the lower portion of FIG. 1.

In the diffuse state, the camera may be able to capture a very blurred image of the user as illustrated by the image 118 in FIG. 1. Some embodiments can control the level of clarity, providing a user with control over the resolution of the image. The level of image clarity could be selected by the user or, as an example, image recognition software could be utilized to measure image clarity and maintain the image clarity below a predetermined threshold, thereby ensuring user privacy.

Figure 2:
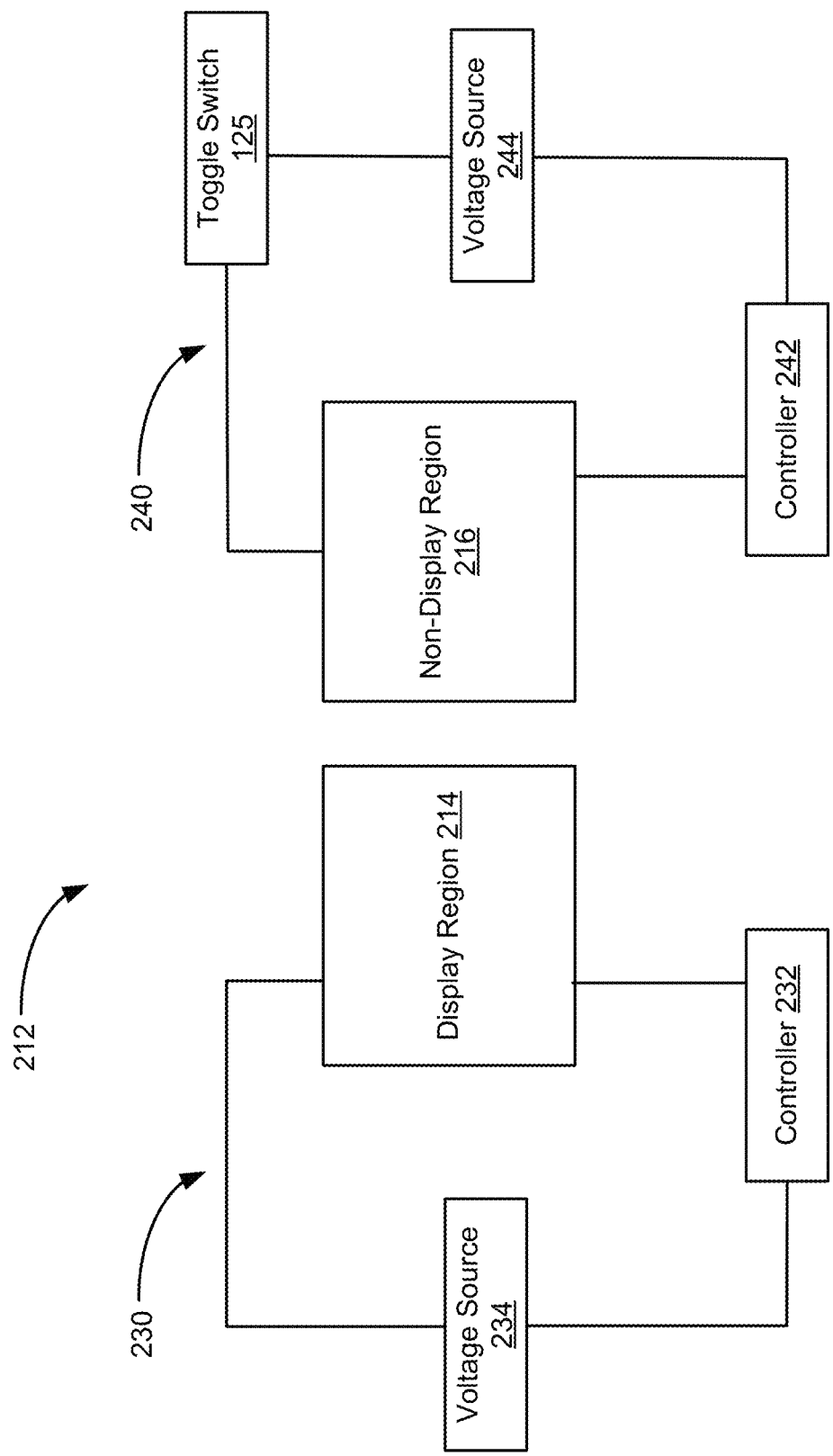
FIG. 2 illustrates a schematic diagram of electrical components of a device for controlling a liquid crystal display according to an embodiment of the present disclosure.

FIG. 2 illustrates a schematic diagram of electrical components of a device for controlling a liquid crystal display according to an embodiment of the present disclosure. The liquid crystal display 212 includes a display region 214 and a non-display region 216 that are controlled by respective circuits. That is, display region 214 is controlled by a display driver circuit 230 and the non-display region 216 is controlled by a non-display region driver circuit 240. As discussed more fully in relation to FIG. 3, the liquid crystal display can be utilized in conjunction with a camera disposed adjacent the non-display region 216 and operable to receive light propagating through the non-display region 216.

In an example, the display driver circuit 230 can be coupled to a glass substrate supporting a thin-film transistor layer of the liquid crystal display 212 and to a logic board of the device. The display driver circuit 230 can include a controller 232 for controlling a voltage 234 applied to the electrodes in the display region 214. The voltage 234 may be a set of voltages, which can be referred to as display voltages, that control operation of pixels of the device. The display voltages may vary and be different for each pixel.

The non-display region driver circuit 240 can also be coupled to the thin-film transistor layer, but may be independent from the main board of the device. The non-display region driver circuit 240 can include a controller 242 for controlling a voltage 244 applied to the electrodes in the non-display region 216. Applying the voltage 244 may cause liquid crystal molecules in the non-display region to change state from a first, diffuse state to a second transmissive state, thereby allowing light to propagate through the non-display region 216 with reduced or no scattering. The controller 242 may apply the voltage 244 in response to a user operating a switch. For instance, the user may operate the toggle switch 125. In response to the user operating the toggle switch 125, voltage 244 is applied to the electrodes in the non-display region 216. Although the toggle switch 125 is illustrated on the front face of the device 110, this is not required and the toggle switch 125 can be placed on any other suitable surface of the device 110, including on the edge of the device 110, for example, the top edge above the illustrated position.

Some embodiments described herein provide less complex overall architectures than conventional systems since the non-display region 216 can be independently operated by the controller 242. Thus, separate control of the display region 214 and the non-display region 216 can be implemented. The non-display region 216 can utilize the controller 242, which can be independent from the controller 232, and the voltage 244, which can be independent from the voltage 234. As a result, the non-display region 216 can be controlled using the controller 242, not the controller 232 (i.e., the controller used to control the display region 214), resulting in reduced system complexity, reduced requirements for the controller 232, and the like. The controller 242, which may be much simpler than the controller 232, may also provide power savings.

Figure 3:
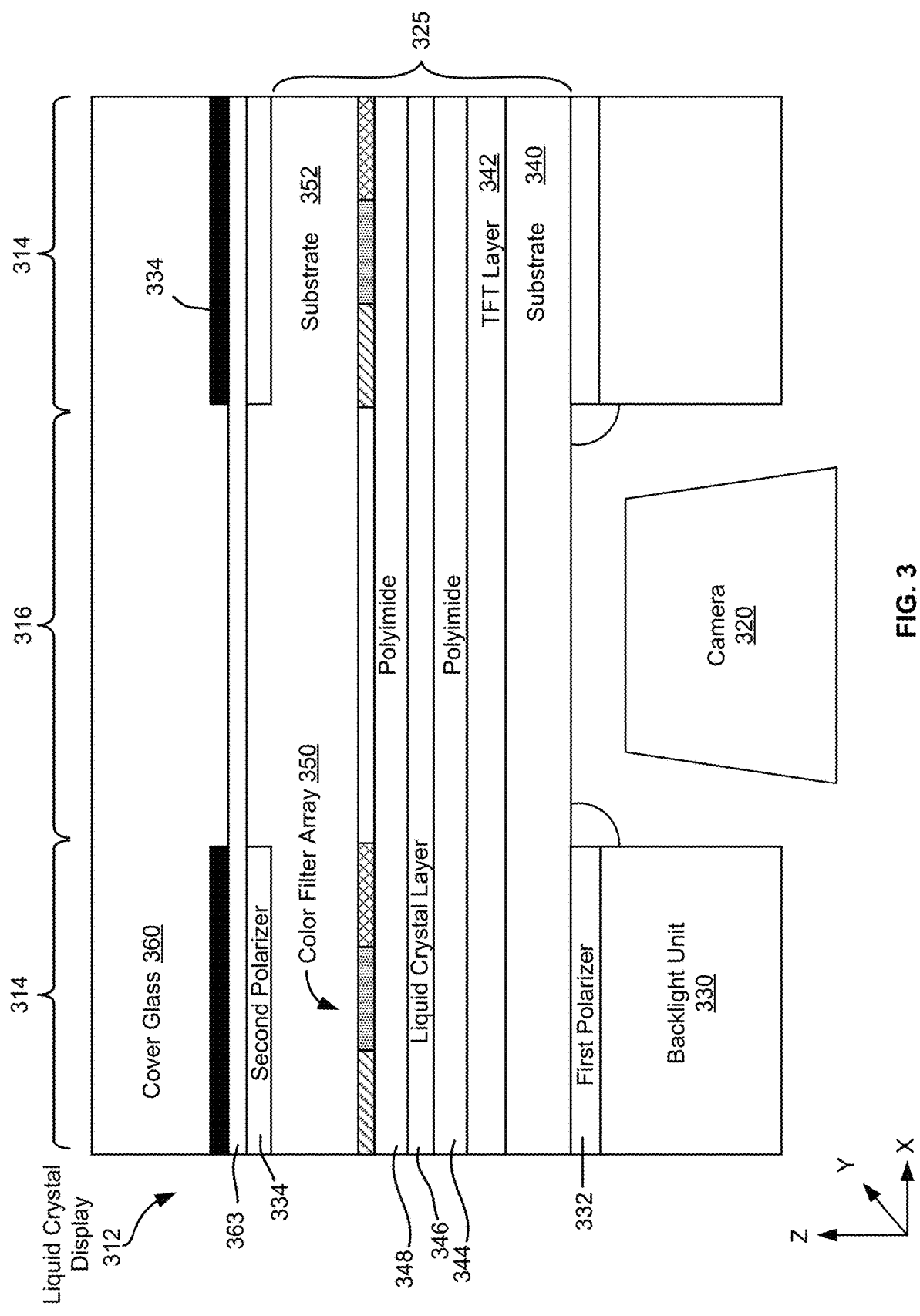
FIG. 3 illustrates a cross-sectional view of a liquid crystal display having a display region and a non-display region according to an embodiment of the present disclosure.

FIG. 3 illustrates a cross-sectional view of a liquid crystal display having a display region and a non-display region according to an embodiment of the present disclosure. As illustrated in FIG. 3, the liquid crystal display 312 has a display region 314 and a non-display region 316. In this embodiment, the display region 314 is present on both sides of the non-display region 316. Referring to FIG. 1, the display region 314 surrounds the non-display region and in FIG. 3, this architecture is illustrated by the display region 314 being present on both sides of the non-display region 316. The liquid crystal display 312 may be part of a display device that also includes a camera 320. The liquid crystal display 312 has a length measured in an X-direction, a height measured in a Y-direction, and a thickness or depth measured in a Z-direction. Light emitted from the liquid crystal display 312 propagates in the Z-direction and light detected by the camera 320 propagates in the negative Z-direction. The liquid crystal display 312 includes a backlight unit 330, a first polarizer 332, a second polarizer 334, and a thin-film transistor structure 325 disposed between the first polarizer 332 and the second polarizer 334. The thin-film transistor structure 325 includes a substrate 340 (e.g., a glass substrate) supporting a thin-film transistor layer 342, a polyimide layer 344, a liquid crystal layer 346, a polyimide layer 348, a color filter array 350, and a substrate 352, (e.g., glass substrate). Each of the backlight unit 330, the first polarizer 332, the thin-film transistor structure 325, and the second polarizer 334 are positioned laterally in the XY-plane and have thicknesses that are measured in the Z-direction. Cover glass 360 provides mechanical rigidity and serves as a protective structure. Thus, the geometry illustrated in FIG. 3 corresponds to the XY-plane being the lateral plane and the Z-direction being the longitudinal direction.

The camera 320 receives light propagating in the negative Z-direction through the non-display region 316 from locations in front of the liquid crystal display 312. To increase the intensity of the light received by the camera 320, the non-display region 316 of the liquid crystal display 312 does not include the backlight unit 330, the first polarizer 332, color filters of the color filter array 350, or the second polarizer 334. In other words, each of these components is only present in the display region 314. Because the backlight unit 330 has been removed in the non-display region 316, the camera 320 is positioned in the non-display region 316 at a longitudinal position equal to that of the backlight unit 330, resulting in the camera 320 in the non-display region 316 and the backlight unit 330 in the display region 314 being positioned in the same lateral plane.

The backlight unit 330 can include a light source of the display device, such as light-emitting diodes (LEDs), an electroluminescent panel (ELP), cold cathode fluorescent lamps (CCFLs), hot cathode fluorescent lamps (HCFLs), or external electrode fluorescent lamps (EEFLs). The backlight unit 330 is coupled to the first polarizer 332, which can be a down polarizer. The first polarizer 332 is a filter that blocks light waves of a certain polarization while allowing light waves of a different polarization to pass through. The first polarizer 332 can be coupled to the thin-film transistor layer 342, which is coupled to the liquid crystal layer 346, which in turn is coupled to the color filter array 350 that is coupled to the second polarizer 334. The second polarizer 334 may be an up polarizer. The second polarizer 334 can also be a filter that blocks light waves of a certain polarization while allowing light waves of a different polarization to pass through. The first polarizer 332 and the second polarizer 334 can be made of a clear crystalline material. The light produced by the backlight unit 330 passes through the first polarizer 332 before reaching a pixel layer of the liquid crystal display 312 (i.e., color filters in the color filter array 350).

In general, pixels in the liquid crystal display 312 must encode a specific level of brightness to create a visible image. Accordingly, creating an image with a liquid crystal display that includes a large number (e.g., millions) of pixels involves encoding varying levels of brightness. Some of the pixels, for example, may need to be brighter than others. Using the structure illustrated in the display region 314, the liquid crystal display 312 can control the brightness of the pixels, resulting in the production of visible images.

The thin-film transistor layer 342 can include a layer of indium tin oxide abutting the liquid crystal layer 346 that forms an electrode used by a non-display region driver circuit of the liquid crystal display 312. When no voltage is applied to the layer of indium tin oxide, or other suitable electrode, liquid crystal molecules in the display region 314 of the liquid crystal layer 346 may have a first structure and liquid crystal molecules in the non-display region 316 of the liquid crystal layer 346 may have a second structure. The first structure may have liquid crystal molecules in a first state (e.g., substantially aligned) and the second structure may have liquid crystal molecules in a second state (e.g., unaligned, for example, randomly aligned). Liquid crystal molecules in the first state allow light to pass through the liquid crystal layer 346 to provide a suitable display image from the liquid crystal display 312 when appropriate drive voltages are applied to the electrodes in the display region 314. Since the liquid crystal molecules in the second state are positioned in the non-display region 316 along with the camera 320, the image generated by the camera may be blurry. In some instances, an image may be generated by the camera 320 and presented by the liquid crystal display 312 concurrently. If no voltage is applied to the electrodes in the non-display region 316, the generated image is blurry. But, if a voltage is applied to the electrodes in the non-display region 316, the liquid crystal molecules in the non-display region 316 may transition to the first state, providing a clear light path for light received by the camera 320. Accordingly, when the appropriate voltage is applied to the electrodes in the non-display region 316, the image generated by the camera 320 may be clear.

The color filter array 350 includes color filters for producing color images. When power is provided to the liquid crystal display 312, the backlight unit 330 emits light that passes through the color filters of the color filter array 350. The color filters filter specific colors so that only light in the appropriate colors continue propagating. The color filters of the color filter array 350 can include sets of red, green, and blue filters arranged along the X-axis and the Y-axis (not shown).

In an example implementation, the liquid crystal display 312 may additionally include an optically clear adhesive and black ink. The optically clear adhesive may be present in both the display region 314 and the non-display region 316, whereas the black ink may only be present in the display region 314. The optically clear adhesive can be included to enhance brightness and contrast of the liquid crystal display 312.

Figure 4:
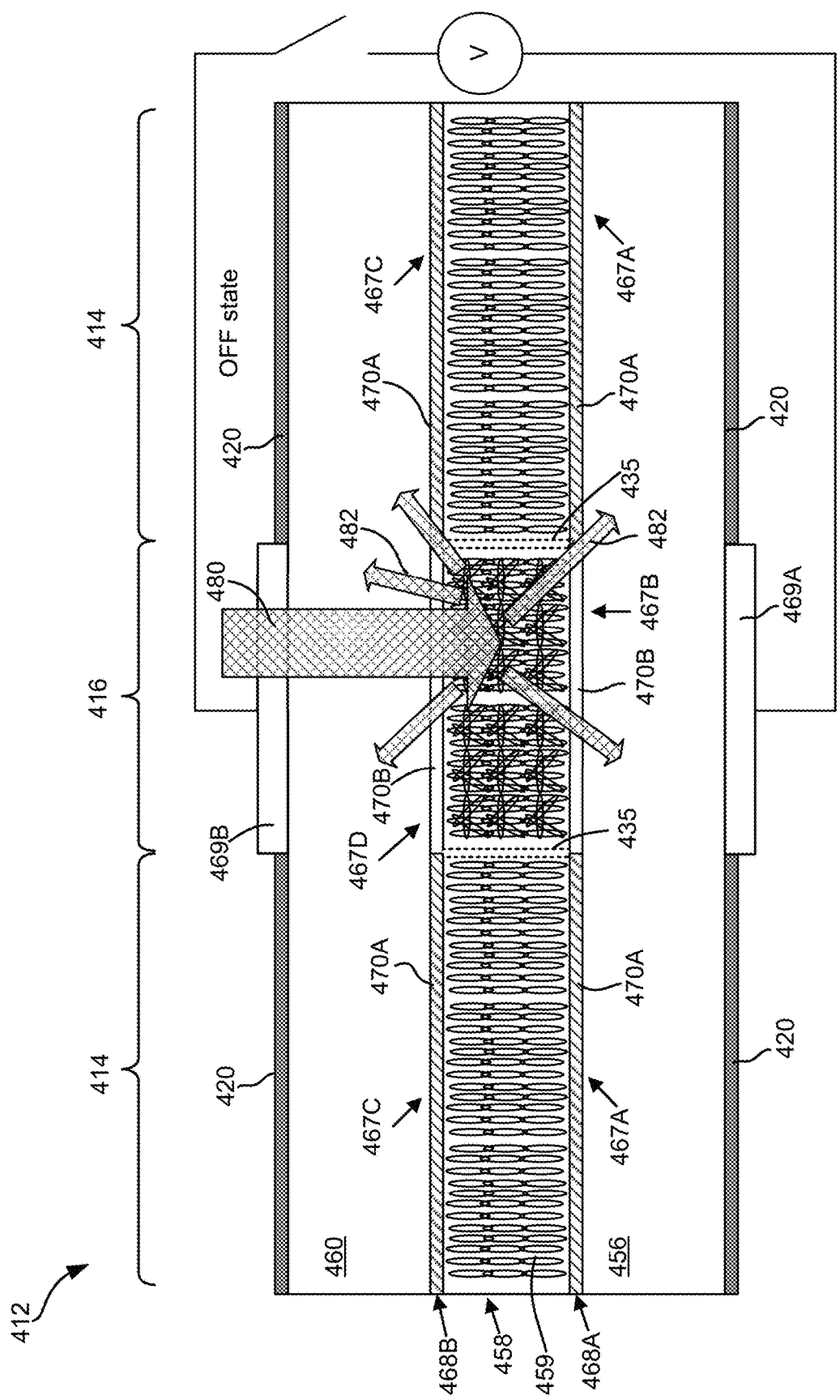
FIG. 4 illustrates a cross-sectional schematic view of a non-display region of a liquid crystal display operating in a diffuse state according to an embodiment of the present disclosure.

FIG. 4 illustrates a cross-sectional schematic view of a non-display region of a liquid crystal display operating in a diffuse state according to an embodiment of the present disclosure. Specifically, the non-display region 416 of the liquid crystal display 412 is illustrated during operation in a diffuse state in FIG. 4. The liquid crystal display 412 includes a thin-film transistor layer 456, first polyimide layer 468A and second polyimide layer 468B, a liquid crystal layer 458, and a color filter array substrate 460 including color filters in the display region 414. The liquid crystal layer 458 is positioned between the first polyimide layer 468A and the second polyimide layer 468B. The non-display region 416 is a region in which a camera (e.g., camera 320 in FIG. 3) is positioned to generate an image.

Although not shown in FIG. 4, the liquid crystal display 412 can also include a backlight unit, a first polarizer layer, a second polarizer layer, an optically clear adhesive, black ink, and a cover glass. The color filter array substrate 460 can include color filters in the display region 414, but lack color filters in the non-display region 416. Similarly, the backlight unit, the first polarizer layer, the second polarizer layer, and the black ink may be absent in the non-display region 416. The backlight unit can include a light source of the display device, such as light-emitting diodes, an electroluminescent panel, cold cathode fluorescent lamps, hot cathode fluorescent lamps, or external electrode fluorescent lamps. The backlight unit can be coupled to the first polarizer, which is a filter that blocks light waves of a certain polarization while allowing light waves of a different polarization to pass through. The first polarizer can be coupled to the thin-film transistor layer 456, which is coupled to the liquid crystal layer 458, which in turn is coupled to the color filter array substrate 460 that is coupled to the second polarizer. The second polarizer can also be a filter that blocks light waves of a certain polarization while allowing light waves of a different polarization to pass through. The first polarizer and the second polarizer can be made of a clear crystalline material. The light produced by the backlight unit passes through the first polarizer and the second polarizer before reaching a pixel layer of the liquid crystal display 412.

The color filter array substrate 460 includes color filters for producing color images. When power is provided to the liquid crystal display 412, the backlight unit emits light that passes through the color filters. The color filters filter specific colors so that only light in the appropriate colors continue propagating. The color filters can include sets of red, green, and blue filters arranged along the X-axis.

Each of the first polyimide layer 468A and the second polyimide layer 468B includes two regions that are characterized by two structures. A first region 467A of the first polyimide layer 468A is in the display region 414 and a second region 467B of the first polyimide layer 468A is in the non-display region 416. Similarly, a third region 467C of the second polyimide layer 468B is in the display region 414 and a fourth region 467D of the second polyimide layer 468B is in the non-display region 416. Sets of electrodes 420 are provided in the display region 414 to provide drive signals to the liquid crystal layer 458 in the display region 414. A structure 470A of the first region 467A of the first polyimide layer 468A and the third region 467C of the second polyimide layer 468B may be a structure that causes liquid crystal molecules 459 in the liquid crystal layer 458 in the display region 414 to be disposed in a first state. In the embodiment illustrated in FIG. 4, the first state is a state in which the liquid crystal molecules 459 in the liquid crystal layer 458 in the display region 414 have a first alignment (e.g., are aligned). In contrast, a structure 470B of the second region 467B of the first polyimide layer 468A and the fourth region 467D of the second polyimide layer 468B may be a structure that causes liquid crystal molecules 459 in the liquid crystal layer 458 in the display region 414 to be disposed in a second state. In the embodiment illustrated in FIG. 4, the second state is a state in which the liquid crystal molecules 459 in the liquid crystal layer 458 in the non-display region 416 have a second alignment (e.g., are randomly oriented). As an example, the structure 470A may be a rubbed structure and the structure 470B may be an unrubbed structure. The structure 470A can cause the liquid crystal molecules 459 in the liquid crystal layer 458 in the first region 467A and the third region 467C (e.g., the display region 414) to be aligned along the rubbing direction. It will be appreciated by one of skill in the art that various methods for changing the state of the liquid crystal molecules 459 in the liquid crystal layer 458 can be utilized and rubbed/ unrubbed structures are merely exemplary. There may, but need not, be a wall 435 in the liquid crystal layer 458 between the display region 414 and the non-display region 416 so that the liquid crystal molecules 459 do not move between the display region 414 and the non-display region 416.

As illustrated in FIG. 4, the non-display region 416 is in an OFF state, corresponding to no voltage being applied to the electrode 469A and the electrode 469B of non-display region 416. Since no voltage is applied to the electrode 469A and the electrode 469B of non-display region 416, the liquid crystal molecules 459 in the liquid crystal layer 458 in the second region 467B and the fourth region 467D (e.g., the non-display region 416) remain unaligned. As a result, the liquid crystal molecules 459 in the non-display region 416 act as a diffuser and scatter light that propagates through the non-display region 416. As illustrated in FIG. 4, light 480 incident on the non-display region 416 is scattered as shown by scattered rays 482. As a result, a clear image may not be generated by a camera that is positioned in the non-display region 416. Rather, the non-display region 416 will be semi-transparent, translucent, or the like. As such, when there is an absence of a voltage being applied to the electrode 469A and the electrode 469B of the non-display region 416, the non-display region 416 can be considered to be operating in the diffuse state.

Figure 5:
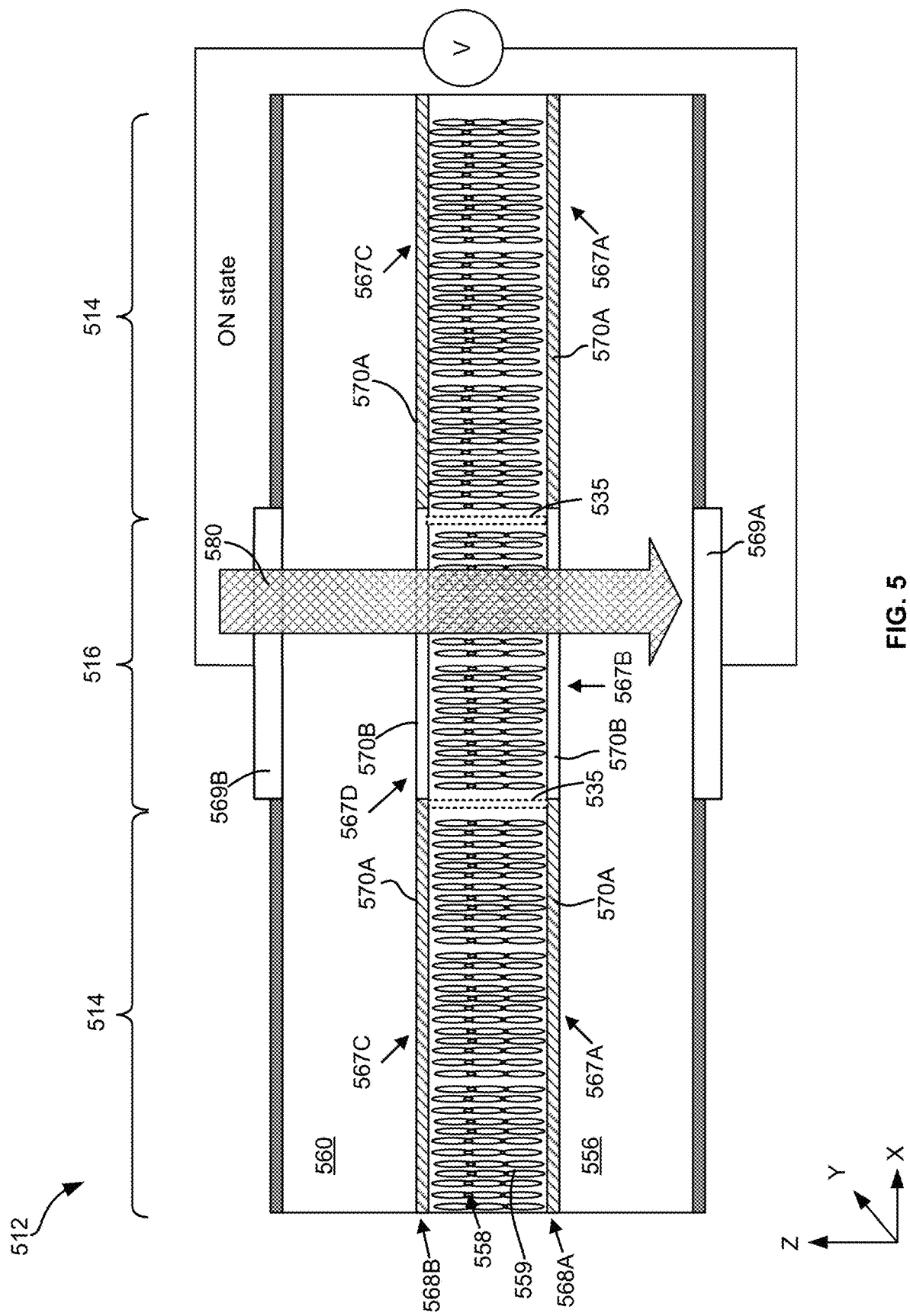
FIG. 5 illustrates a cross-sectional schematic view of a non-display region of a liquid crystal display operating in a transmissive state according to an embodiment of the present disclosure.

FIG. 5 illustrates a cross-sectional schematic view of a non-display region of a liquid crystal display operating in a transmissive state according to an embodiment of the present disclosure. Specifically, the non-display region 516 of the liquid crystal display 512 is illustrated during operation in a transmissive state in FIG. 5. The liquid crystal display 512 illustrated in FIG. 5 shares common elements with the liquid crystal display 412 illustrated in FIG. 4 and the description provided in FIG. 4 is applicable to FIG. 5 as appropriate.

The liquid crystal display 512 includes a thin-film transistor layer 556, first polyimide layer 568A and second polyimide layer 568B, a liquid crystal layer 558, and a color filter array glass 560 in a non-display region 516 and a display region 514. The liquid crystal layer 558 is positioned between the first polyimide layer 568A and the second polyimide layer 568B. The non-display region 516 is a region in which a camera (e.g., camera 320 in FIG. 3) is positioned to generate an image.

The liquid crystal display 512 can also include a backlight unit, a first polarizer, a second polarizer, an optically clear adhesive, black ink, and a cover glass. The color filter array glass 560 can include color filters in the display region 514, but be devoid of color filters in the non-display region 516. Similarly, the backlight unit, the first polarizer, the second polarizer, and the black ink may be absent in the non-display region 516. The backlight unit can include a light source of the display device, such as light-emitting diodes, an electroluminescent panel, cold cathode fluorescent lamps, hot cathode fluorescent lamps, or external electrode fluorescent lamps. The backlight unit can be coupled to the first polarizer, which is a filter that blocks light waves of a certain polarization while allowing light waves of a different polarization to pass through. The first polarizer can be coupled to the thin-film transistor layer 556, which is coupled to the liquid crystal layer 558, which in turn is coupled to the color filter array glass 560 that is coupled to the second polarizer. The second polarizer can also be a filter that blocks light waves of a certain polarization while allowing light waves of a different polarization to pass through. The first polarizer and the second polarizer can be made of a clear crystalline material. The light produced by the backlight unit passes through the first polarizer and the second polarizer before reaching a pixel layer of the liquid crystal display 512.

The color filter array glass 560 includes color filters for producing color images. When power is provided to the liquid crystal display 512, the backlight unit emits light that passes through the color filters. The color filters filter specific colors so that only light in the appropriate colors continue propagating. The color filters can include sets of red, green, and blue filters arranged along the X-axis.

Each of the first polyimide layer 568A and the second polyimide layer 568B includes two regions that are characterized by two structures. A first region 567A of the first polyimide layer 568A is in the display region 514 and a second region 567B of the first polyimide layer 568A is in the non-display region 516. Similarly, a third region 567C of the second polyimide layer 568B is in the display region 514 and a fourth region 567D of the second polyimide layer 568B is in the non-display region 516. A structure 570A of the first region 567A of the first polyimide layer 568A and the third region 567C of the second polyimide layer 568B may be a structure that causes liquid crystal molecules 559 in the liquid crystal layer 558 in the display region 514 to be disposed in a first state. In the embodiment illustrated in FIG. 5, the first state is a state in which the liquid crystal molecules 559 in the liquid crystal layer 558 in the display region 514 have a first alignment (e.g., are aligned). In contrast, a structure 570B of the second region 567B of the first polyimide layer 568A and the fourth region 567D of the second polyimide layer 568B may be a structure that causes liquid crystal molecules 559 in the liquid crystal layer 558 in the display region 514 to be disposed in a second state. In the embodiment illustrated in FIG. 5, the second state is a state in which the liquid crystal molecules 559 in the liquid crystal layer 558 in the non-display region 516 have a second alignment (e.g., are randomly oriented). As an example, the structure 570A may be a rubbed structure and the structure 570B may be an unrubbed structure. The structure 570A can cause the liquid crystal molecules 559 in the liquid crystal layer 558 in the first region 567A and the third region 567C (e.g., the display region 514) to be aligned along the rubbing direction. It will be appreciated to one of skill in the art that various methods for changing the state of the liquid crystal molecules 559 in the liquid crystal layer 558 can be utilized and rubbed/unrubbed structures are merely exemplary. There may, but need not, be a wall 535 in the liquid crystal layer 558 between the display region 514 and the non-display region 516 so that the liquid crystal molecules 559 do not move between the display region 514 and the non-display region 516.

As illustrated in FIG. 5, the non-display region 516 is in an ON state, corresponding to an application of a voltage to the electrodes in the non-display region 516. When the voltage is applied, the liquid crystal molecules 559 in the liquid crystal layer 558 in the second region 567B and the fourth region 567D (e.g., the non-display region 516) transition to the first state (e.g., become aligned). So, light that propagates in the non-display region 516 is able to pass through the liquid crystal molecules 559 in the non-display region 516. As a result, a clear image may be generated by a camera that is positioned in the non-display region 516. In contrast with the semi-transparent or translucent behavior illustrated in FIG. 4, light 580 incident on the non-display region 516 is transmitted through the non-display region 516 rather than being scattered. As such, when there is a voltage being applied to the electrode 569A and the electrode 569B of the non-display region 516, the non-display region 516 can be considered to be operating in the transmissive state.

Figure 6:
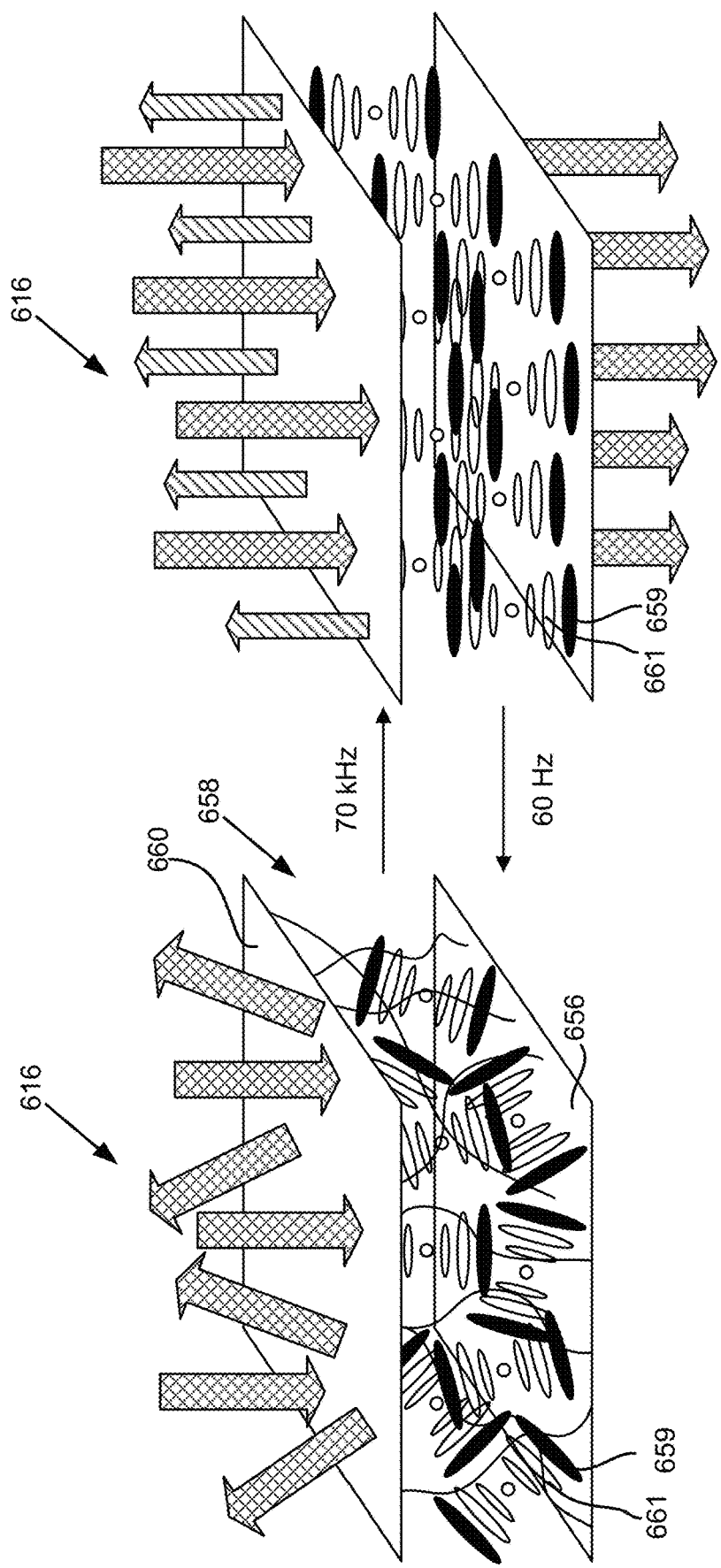
FIG. 6 illustrates a perspective schematic view of a non-display region of a liquid crystal display that includes a doped polymer in a diffuse state or a transmissive state according to an embodiment of the present disclosure.

FIG. 6 illustrates a perspective schematic view of a non-display region of a liquid crystal display that includes a doped polymer in a diffuse state or a transmissive state according to an embodiment of the present disclosure. In FIG. 6, a non-display region 616 of a liquid crystal display is illustrated that includes a doped polymer 661. The liquid crystal display includes a thin-film transistor layer 656, a liquid crystal layer 658, and a color filter array glass 660 in the non-display region 616. The liquid crystal layer 658 is positioned between the thin-film transistor layer 656 and the color filter array glass 660. The non-display region 616 is a region in which a camera (e.g., camera 320 in FIG. 3) is positioned to generate an image. Although not shown in FIG. 6, the liquid crystal display can also include a display region that includes the thin-film transistor layer 656, the liquid crystal layer 658, the color filter array glass 660, along with a backlight unit and polarizers.

The liquid crystal display can also include a backlight unit, a first polarizer, a second polarizer, an optically clear adhesive, black ink, and a cover glass. The color filter array glass 660 can include color filters in the display region, but lack color filters in the non-display region 616. Similarly, the backlight unit, the first polarizer, the second polarizer, and the black ink may be absent in the non-display region 616. The backlight unit can include a light source of the display device, such as light-emitting diodes, an electroluminescent panel, cold cathode fluorescent lamps, hot cathode fluorescent lamps, or external electrode fluorescent lamps. The backlight unit can be coupled to the first polarizer, which is a filter that blocks light waves of a certain polarization while allowing light waves of a different polarization to pass through. The first polarizer can be coupled to the thin-film transistor layer 656, which is coupled to the liquid crystal layer 658, which in turn is coupled to the color filter array glass 660 that is coupled to the second polarizer. The second polarizer can also be a filter that blocks light waves of a certain polarization while allowing light waves of a different polarization to pass through. The first polarizer and the second polarizer can be made of a clear crystalline material. The light produced by the backlight unit passes through the first polarizer and the second polarizer before reaching a pixel layer of the liquid crystal display.

The color filter array glass 660 includes color filters for producing color images. When power is provided to the liquid crystal display, the backlight unit emits light that passes through the color filters. The color filters filter specific colors so that only light in the appropriate colors continue propagating. The color filters can include sets of red, green, and blue filters arranged along the X-axis.

In addition to liquid crystal molecules 659, the non-display region 616 can also include a doped polymer 661. The doped polymer 661 may be, for example, a silicon nanostructure. When no voltage, or a voltage below a frequency threshold (e.g., 1 kHz), is applied to the electrodes in the non-display region 616, the liquid crystal molecules 659 and the doped polymer 661 can be characterized by a first state. In the embodiment illustrated in FIG. 6, the first state is a state in which the liquid crystal molecules 659 in the liquid crystal layer 658 in the non-display region 616 have a first alignment (e.g., are randomized). At the low frequency, the liquid crystal molecules 659 and the doped polymer 661 in the non-display region 616 act as a diffuser and scatter light that propagates in the non-display region 616. As a result, a clear image may not be generated by a camera that is positioned in the non-display region 616. As such, the non-display region 616 can be considered to be operating in the diffuse state.

In contrast, when a voltage above the frequency threshold is applied to the electrodes in the non-display region 616, the doped polymer 661 can stabilize and the liquid crystal molecules 659 and the doped polymer 661 can transition to a second state. In the embodiment illustrated in FIG. 6, the second state is a state in which the liquid crystal molecules 659 in the liquid crystal layer 658 in the non-display region 616 have a second alignment (e.g., are aligned). Accordingly, light that propagates in the non-display region 616 is able to pass through the liquid crystal molecules 659 and the doped polymer 661 in the non-display region 616. As a result, a clear image may be generated by a camera that is positioned in the non-display region 616. As such, when there is a voltage with a sufficient frequency being applied to the electrodes in the non-display region 616, the non-display region 616 can be considered to be operating in the transmissive state.

Figure 7:
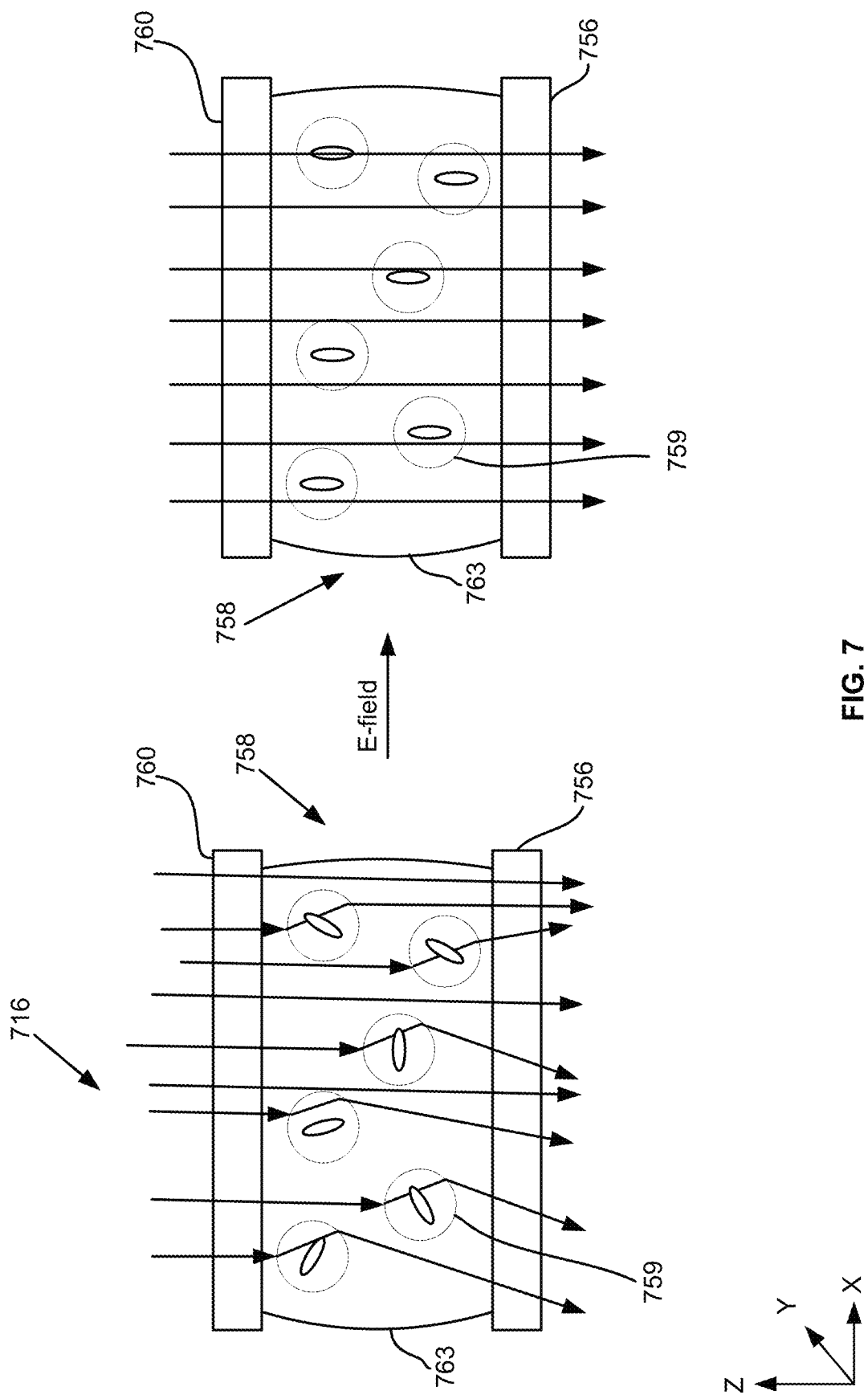
FIG. 7 illustrates a perspective schematic view of a non-display region of a liquid crystal display that includes a polymer matrix in a diffuse state or a transmissive state according to an embodiment of the present disclosure.

FIG. 7 illustrates a perspective schematic view of a non-display region of a liquid crystal display that includes a polymer matrix in a diffuse state or a transmissive state according to an embodiment of the present disclosure. In FIG. 7, a non-display region 716 of a liquid crystal display that includes a polymer matrix 763 is illustrated. The liquid crystal display includes a thin-film transistor layer 756, a liquid crystal layer 758, and a color filter array glass 760 in the non-display region 716. The liquid crystal layer 758 is positioned between the thin-film transistor layer 756 and the color filter array glass 760. The non-display region 716 is a region in which a camera (e.g., camera 320 in FIG. 3) is positioned to generate an image. Although not shown in FIG. 7, the liquid crystal display can also include a display region that includes the thin-film transistor layer 756, the liquid crystal layer 758, the color filter array glass 760, along with a backlight unit and polarizers.

The liquid crystal display can also include a backlight unit, a first polarizer, a second polarizer, an optically clear adhesive, black ink, and a cover glass. The color filter array glass 760 can include color filters in the display region, but lack color filters in the non-display region 716. Similarly, the backlight unit, the first polarizer, the second polarizer, and the black ink may be absent in the non-display region 716. The backlight unit can include a light source of the display device, such as light-emitting diodes, an electroluminescent panel, cold cathode fluorescent lamps, hot cathode fluorescent lamps, or external electrode fluorescent lamps. The backlight unit can be coupled to the first polarizer, which is a filter that blocks light waves of a certain polarization while allowing light waves of a different polarization to pass through. The first polarizer can be coupled to the thin-film transistor layer 756, which is coupled to the liquid crystal layer 758, which in turn is coupled to the color filter array glass 760 that is coupled to the second polarizer. The second polarizer can also be a filter that blocks light waves of a certain polarization while allowing light waves of a different polarization to pass through. The first polarizer and the second polarizer can be made of a clear crystalline material. The light produced by the backlight unit passes through the first polarizer and the second polarizer before reaching a pixel layer of the liquid crystal display.

The color filter array glass 760 includes color filters for producing color images. When power is provided to the liquid crystal display, the backlight unit emits light that passes through the color filters. The color filters filter specific colors so that only light in the appropriate colors continue propagating. The color filters can include sets of red, green, and blue filters arranged along the X-axis.

In an example, the liquid crystal layer 758 can include polymer-dispersed liquid crystals, which is a combination of liquid crystal molecules 759 and a polymer matrix 763. As illustrated, the structure of the liquid crystal layer 758 includes micro-sized liquid crystal molecules filling in holes in the polymer matrix 763. The liquid crystal molecules 759 are in a first state when no voltage is applied. In the embodiment illustrated in FIG. 7, the first state is a state in which the liquid crystal molecules 759 in the liquid crystal layer 758 in the non-display region 716 have a first alignment (e.g., are randomized). In this state, the effective refractive index of the liquid crystal molecules 759 and the refractive index of the polymer matrix 763 are mismatched, which causes light propagating in the non-display region 716 to scatter. As a result, a clear image may not be generated by a camera that is positioned in the non-display region 716. As such, the non-display region 716 can be considered to be operating in the diffuse state.

In contrast, when a voltage is applied to the electrodes in the non-display region 716, the liquid crystal molecules 759 transition to a second state. In the embodiment illustrated in FIG. 7, the second state is a state in which the liquid crystal molecules 759 in the liquid crystal layer 758 in the non-display region 716 have a second alignment (e.g., are aligned). The liquid crystal molecules 759 reorient along the direction of the electric field, and the incident light passes through the non-display region 716 without scattering since the effective refractive index of the liquid crystal molecules 759 matches the refractive index of the polymer matrix 763. As a result, a clear image may be generated by a camera that is positioned in the non-display region 716. As such, when there is a sufficient voltage being applied to the electrodes in the non-display region 716, the non-display region 716 can be considered to be operating in the transmissive state. The strength of the electric field required for switching from the diffuse state to the transmissive state depends upon the shape, size, and dielectric anisotropy of the liquid crystal molecules 759.

Figure 8:
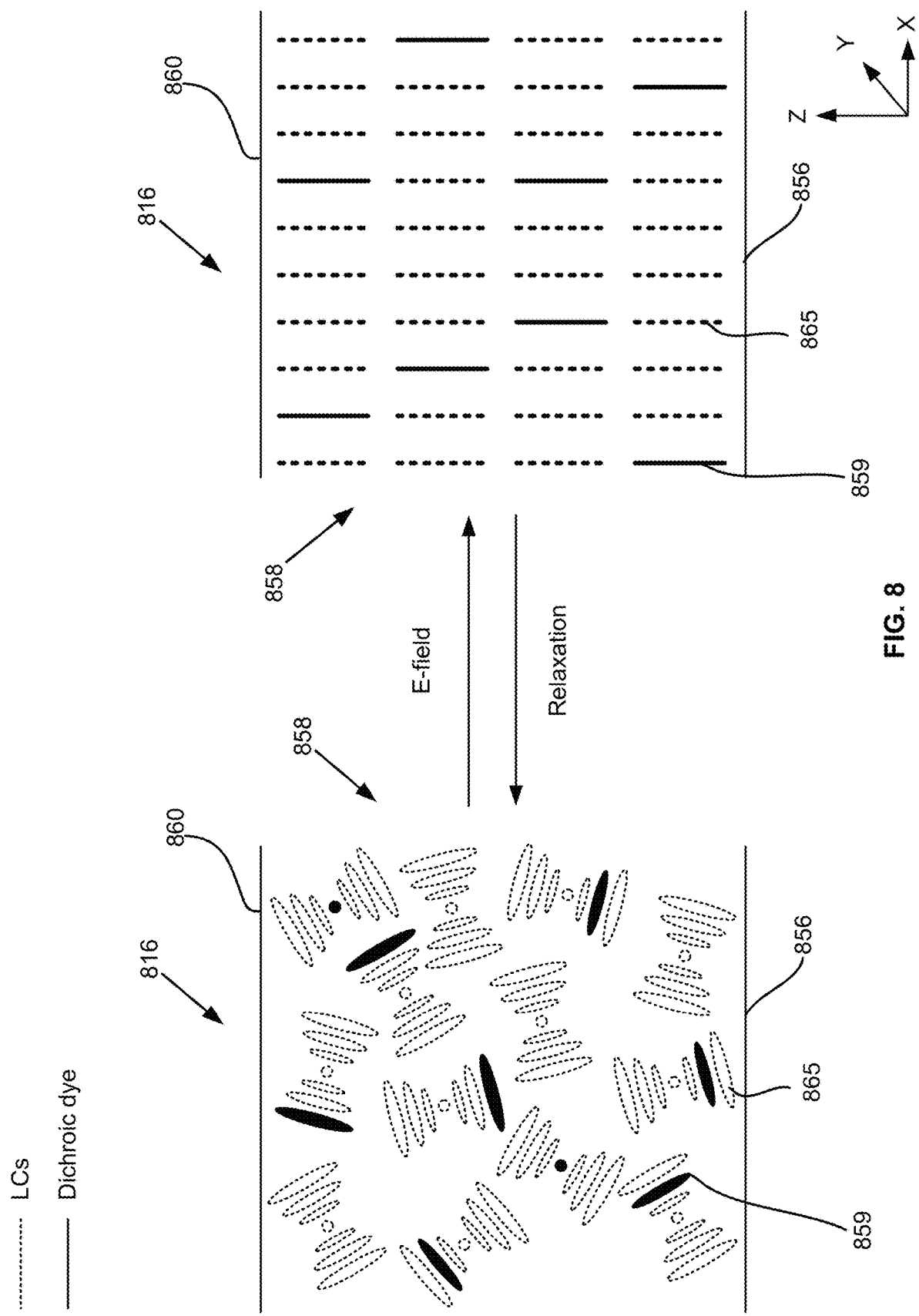
FIG. 8 illustrates a perspective schematic view of a non-display region of a liquid crystal display that includes a cholesteric liquid crystal material in a diffuse state or a transmissive state according to an embodiment of the present disclosure.

FIG. 8 illustrates a perspective schematic view of a non-display region 816 of a liquid crystal display that includes a cholesteric liquid crystal material in a diffuse state or a transmissive state according to an embodiment of the present disclosure. In FIG. 8, the non-display region 816 of a liquid crystal display that includes a cholesteric liquid crystal material 865 is illustrated. The liquid crystal display includes a thin-film transistor layer 856, a liquid crystal layer 858, and a color filter array glass 860 in the non-display region 816. The liquid crystal layer 858 is positioned between the thin-film transistor layer 856 and the color filter array glass 860. The non-display region 816 is a region in which a camera (e.g., camera 320 in FIG. 3) is positioned to generate an image. Although not shown in FIG. 8, the liquid crystal display can also include a display region that includes the thin-film transistor layer 856, the liquid crystal layer 858, the color filter array glass 860, along with a backlight unit, a first polarizer, a second polarizer, an optically clear adhesive, black ink, and a cover glass.

The color filter array glass 860 can include color filters in the display region, but lack color filters in the non-display region 816. Similarly, the backlight unit, the first polarizer, the second polarizer, and the black ink may be absent in the non-display region 816. The backlight unit can include a light source of the display device, such as light-emitting diodes, an electroluminescent panel, cold cathode fluorescent lamps, hot cathode fluorescent lamps, or external electrode fluorescent lamps. The backlight unit can be coupled to the first polarizer, which is a filter that blocks light waves of a certain polarization while allowing light waves of a different polarization to pass through. The first polarizer can be coupled to the thin-film transistor layer 856, which is coupled to the liquid crystal layer 858, which in turn is coupled to the color filter array glass 860 that is coupled to the second polarizer. The second polarizer can also be a filter that blocks light waves of a certain polarization while allowing light waves of a different polarization to pass through. The first polarizer and the second polarizer can be made of a clear crystalline material. The light produced by the backlight unit passes through the first polarizer and the second polarizer before reaching a pixel layer of the liquid crystal display.

The color filter array glass 860 includes color filters for producing color images. When power is provided to the liquid crystal display, the backlight unit emits light that passes through the color filters. The color filters filter specific colors so that only light in the appropriate colors continue propagating. The color filters can include sets of red, green, and blue filters arranged along the X-axis.

In addition to liquid crystal molecules 859, the non-display region 816 can also include a cholesteric liquid crystal material 865. The cholesteric liquid crystal material 865 may be an example of a dye-doped liquid crystal material. The cholesteric liquid crystal material 865 can include the liquid crystal molecules 859 with a helical structure. The cholesteric liquid crystal material 865 can organize in layers with no positional ordering within layers, but a director axis that varies between the layers. The variation of the director axis tends to be periodic in nature, and the period of this variation is the pitch, which determines the wavelength of light which is reflected by the liquid crystal layer 858. Cholesteric liquid crystal materials are bistable. Examples of the cholesteric liquid crystal material 865 can include hydroxypropyl cellulose and cholesteryl benzoate.

When no voltage, or a voltage below a threshold, is applied to the electrodes in the non-display region 816, the liquid crystal molecules 859 and the cholesteric liquid crystal material 865 (or another dye-doped liquid crystal material) can be characterized by a first state. In the embodiment illustrated in FIG. 8, the first state is a state in which the liquid crystal molecules 859 and the cholesteric liquid crystal material 865 in the liquid crystal layer 858 in the non-display region 816 have a first alignment (e.g., are randomized). In the low voltage state, the liquid crystal molecules 859 and the cholesteric liquid crystal material 865 in the non-display region 816 act as a diffuser and scatter light that propagates in the non-display region 816. As a result, a clear image may not be generated by a camera that is positioned in the non-display region 816. As such, the non-display region 816 can be considered to be operating in the diffuse state.

In contrast, when a voltage above the threshold is applied to the electrodes in the non-display region 816, the liquid crystal molecules 859 and the cholesteric liquid crystal material 865 can transition to a second state. In the embodiment illustrated in FIG. 8, the second state is a state in which the liquid crystal molecules 859 and the cholesteric liquid crystal material 865 in the liquid crystal layer 858 in the non-display region 816 have a second alignment (e.g., are aligned). In this state, light that propagates in the non-display region 816 is able to pass through the liquid crystal molecules 859 and the cholesteric liquid crystal material 865 in the non-display region 816. As a result, a clear image may be generated by a camera that is positioned in the non-display region 816. As such, when there is a sufficient voltage being applied to the electrodes in the non-display region 816, the non-display region 816 can be considered to be operating in the transmissive state.

Depending on the particular structure implemented in the non-display region, for example, the structures illustrated in FIGS. 4, 6, 7, and 8, the transition from the first (diffuse) state to the second (transmissive) state can result from a modification of the amplitude of the voltage applied to the electrodes in the non-display region (e.g., increasing the amplitude of a DC voltage source to a value greater than or equal to a threshold voltage), from a modification of the frequency of the voltage applied to the electrodes in the non-display region (e.g., increasing the frequency of an AC voltage source to a value greater than or equal to a threshold frequency), or a combination of amplitude and frequency. Accordingly, depending on the particular liquid crystal technology, different operating modes can be utilized. One of ordinary skill in the art would recognize many variations, modifications, and alternatives.

Figure 9:
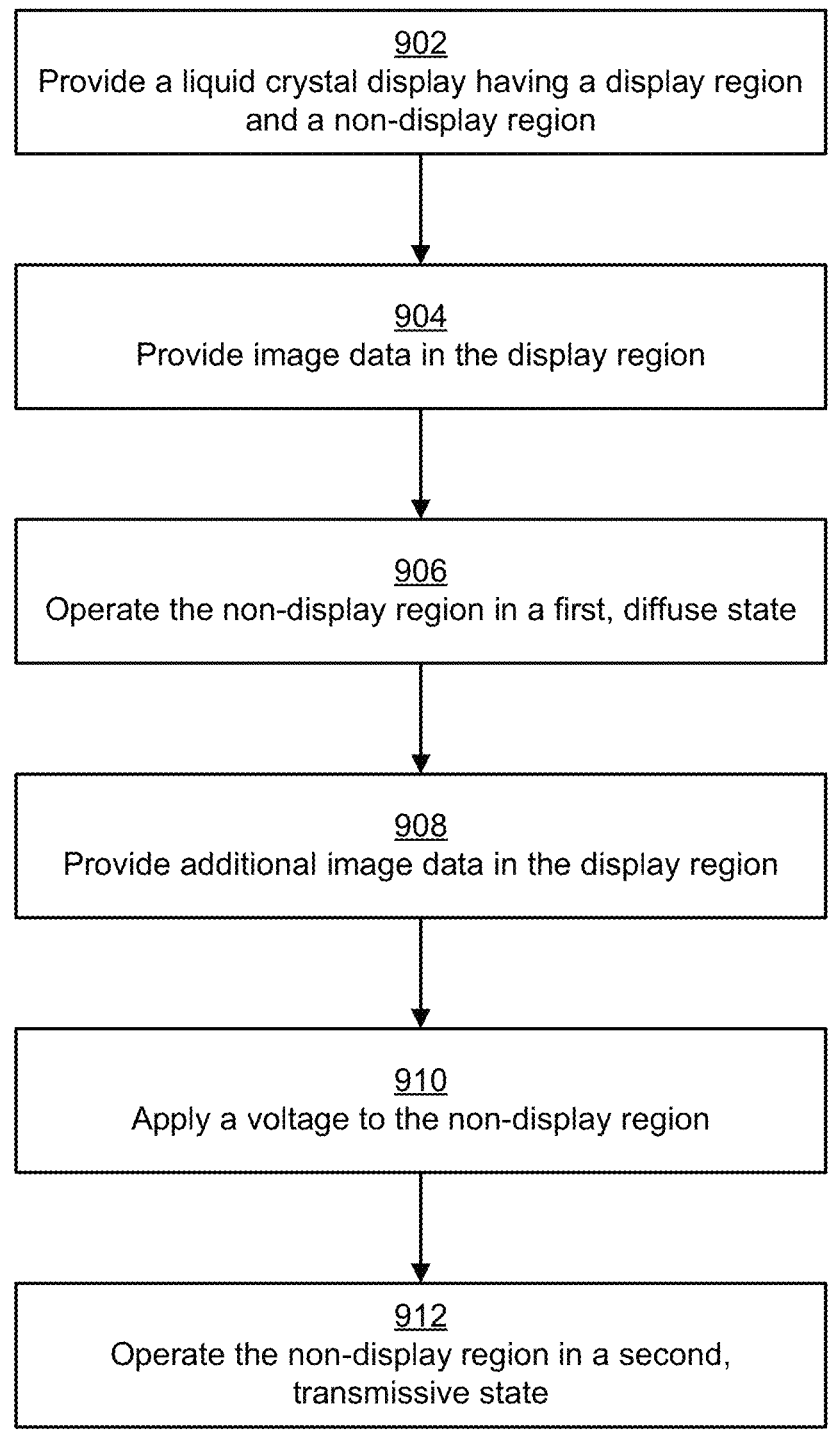
FIG. 9 illustrates an example flow of a process of operating a display device in a first, diffuse state and a second, transmissive state.

FIG. 9 illustrates an example flow of a process of operating a display device in a first, diffuse state and a second, transmissive state. Some or all of the processes (or any other processes described herein, or variations, and/or combinations thereof) may be performed by a display device, such as the device 110 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 902, where the display device provides a liquid crystal display having a display region and a non-display region. The display region can include a first set of liquid crystal molecules that are in a first state (e.g., are aligned) and the non-display region can include a second set of liquid crystal molecules that are in a second state (e.g., are not aligned). The liquid crystal display can include two polyimide layers with liquid crystal molecules between the layers. In the display region, the polyimide layers can have a structure that results in the liquid crystal molecules being in the first state. In contrast, the polyimide layers in the non-display region can have a structure that results in the liquid crystal molecules being in the second state.

In an example, the flow includes operation 904, where the display device provides an image in the display region. A camera of the display device can generate the image. The display region can include a display driver circuit that is different from a non-display region driver circuit of the non-display region. So, a controller of the display driver circuit can cause display voltages to be applied to the electrodes in the display region to cause the image to be provided in the display region.

In an example, the flow includes operation 906, where the display device operates the non-display region in a first, diffuse state. The non-display region may be operated in the first, diffuse state concurrently to the image being provided in the display region. That is, the non-display region driver circuit of the non-display region may not apply a voltage to the electrodes in the non-display region while the display driver circuit provides the display voltages to the electrodes in the display region. With no voltage being applied to the electrodes in the non-display region, the liquid crystal molecules in the non-display region can act as a diffuser and scatter light that propagates in the non-display region. Thus, the image that is generated by the camera is opaque or blurry.

In an example, the flow includes operation 908, where the display device provides an additional image in the display region. The camera of the display device can generate the image.

In an example, the flow includes operation 910, where the display device applies a voltage to the electrodes in the non-display region. The voltage can be a voltage that is sufficient to transition the liquid crystal molecules from the second state to the first state. The non-display region driver circuit of the non-display region can apply the voltage to the electrodes in the non-display region while the display driver applies display voltages to the electrodes in the display region.

In an example, the flow includes operation 912, where the display device operates the non-display region in a second, transmissive state. The non-display region may be operated in the second, transmissive state concurrently to the additional image being provided in the display region. With the applied voltage causing the liquid crystal molecules in the non-display region to transition to the second state, light that propagates in the non-display region can reach the camera. Thus, the image that is generated by the camera is clear.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device comprising:
   a camera;
   a liquid crystal display having a display region and a non-display region, wherein the camera is disposed in the non-display region, and wherein the liquid crystal display comprises:
      a first set of electrodes coupled to a thin-film transistor layer in the non-display region;
      a second set of electrodes coupled to the thin-film transistor layer in the display region;
      a first polyimide layer coupled to the thin-film transistor layer and comprising an aligned structure in the display region and an unaligned structure in the non-display region;
      a second polyimide layer comprising the aligned structure in the display region and the unaligned structure in the non-display region;
      a liquid crystal layer coupled to the first polyimide layer and the second polyimide layer, wherein a first portion of the liquid crystal layer corresponding to the display region is characterized by a first alignment and a second portion of the liquid crystal layer corresponding to the non-display region is characterized by a second alignment; and
      a non-display region driver circuit coupled to the thin-film transistor layer and configured to apply a voltage to the first set of electrodes in the non-display region, wherein an application of the voltage is operable to transition the second portion of the liquid crystal layer to the first alignment.

2. The device of claim 1, further comprising:
   a color filter array coupled to the second polyimide layer, wherein the color filter array is devoid of color filters in the non-display region;
   a first polarizer layer, wherein the first polarizer layer is absent in the non-display region; and
   a second polarizer layer, wherein the second polarizer layer is absent in the non-display region.

3. The device of claim 1, further comprising a display driver circuit coupled to a main board of the device and configured to provide a set of second voltages to the second set of electrodes.

4. The device of claim 1, wherein the liquid crystal layer further comprises a doped polymer or a polymer matrix in the non-display region.

5. An apparatus comprising:
   a liquid crystal layer comprising a first region and a second region, wherein the first region comprises a first plurality of liquid crystal molecules in a first state and the second region comprises a second plurality of liquid crystal molecules in a second state different from the first state;
   a camera positioned to receive light propagating through the second region;
   a first driver circuit configured to apply a first set of voltages to a first set of electrodes in the first region; and
   a second driver circuit configured to apply a second set of voltages to a second set of electrodes in the second region.

6. The apparatus of claim 5, further comprising:
   a backlight unit coupled to the liquid crystal layer;
   a first polarizer coupled to the backlight unit in the first region;
   a thin-film transistor layer coupled to the backlight unit;
   a first polyimide layer coupled to the thin-film transistor layer and comprising a first region in a display region characterized by a first structure and a second region in a non-display region characterized by a second structure;
   a second polyimide layer coupled to the first polyimide layer and comprising a third region in the display region characterized by the first structure and a fourth region in the non-display region characterized by the second structure;
   a color filter array coupled to the second polyimide layer and having a plurality of color filters in the display region;
   a second polarizer coupled to the color filter array in the first region; and
   a cover glass coupled to the second polarizer.

7. The apparatus of claim 6, wherein the backlight unit is absent in the second region.

8. The apparatus of claim 5, wherein the second region further comprises a doped polymer that is configured to stabilize at any one of the second set of voltages or a polymer matrix, wherein the second plurality of liquid crystal molecules are disposed in the polymer matrix.

9. The apparatus of claim 5, wherein the liquid crystal layer comprises a cholesteric liquid crystal material or a dye-doped liquid crystal material.

10. The apparatus of claim 5, further comprising a wall in the liquid crystal layer between a display region and a non-display region.

11. The apparatus of claim 5, wherein the first driver circuit is configured to apply the first set of voltages to the first set of electrodes in a non-display region of a liquid crystal display and the second driver circuit is configured to apply the second set of voltages to the second set of electrodes in a display region of the liquid crystal display.

12. The apparatus of claim 5, wherein the first region comprises a display region and the second region comprises a non-display region, and wherein the apparatus further comprises:
    a first polarizer, wherein the first polarizer is absent in the non-display region; and
    a second polarizer, wherein the second polarizer is absent in the non-display region.

13. The apparatus of claim 5, wherein the first region comprises a display region and the second region comprises a non-display region, and wherein the display region surrounds the non-display region.

14. A method of operating a liquid crystal display (LCD) wherein the LCD includes a display region including a first plurality of liquid crystal molecules and a non-display region including a second plurality of liquid crystal molecules, the method comprising:
    operating the non-display region in a first state, wherein the second plurality of liquid crystal molecules are in an unaligned state;
    displaying, in the first state, first content in the display region;
    operating the non-display region in a second state by applying a voltage to an electrode associated with the non-display region, the voltage causing the second plurality of liquid crystal molecules to be in an aligned state; and
    displaying, in the second state, second content in the display region.

15. The method of claim 14, further comprising displaying third content in the display region, wherein operating the non-display region in the first state or the second state is performed independently from displaying the third content in the display region.

16. The method of claim 14, wherein the first content is not discernable by a user and the second content is discernable by the user.

17. The method of claim 14, wherein the first content is not discernable by a user, the method further comprising displaying in the display region and in the first state, third content that is discernable by the user.

18. The method of claim 17, wherein displaying the first content in the display region and displaying the third content in the display region are performed concurrently, and wherein the first content is characterized by a first content quality metric and the third content is characterized by a second content quality metric greater than the first content quality metric.

19. The method of claim 14, further comprising displaying third content in the display region concurrently with displaying the first or the second content in the display region.

20. The method of claim 14, further comprising capturing the first content and the second content using a camera coupled to the LCD, the method further comprising:
- displaying third content in the display region concurrently with displaying the first content in the first state; and
- subsequently, displaying the third content in the display region concurrently with displaying the second content in the second state.

* * * * *